United States Patent
Han et al.

(10) Patent No.: US 8,020,150 B1
(45) Date of Patent: Sep. 13, 2011

(54) SYSTEM, METHOD, AND COMPUTER PROGRAM PRODUCT FOR CONTROLLING A DRIVER UTILIZING SCRIPTS

(75) Inventors: Gang Han, San Jose, CA (US); Lieven P. Leroy, South San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1046 days.

(21) Appl. No.: 11/747,328

(22) Filed: May 11, 2007

(51) Int. Cl.
*G06F 9/44* (2006.01)
*G06F 9/45* (2006.01)

(52) U.S. Cl. .................. 717/124; 717/128; 717/140

(58) Field of Classification Search .............. 717/106, 717/115, 118, 124–129, 139–143
See application file for complete search history.

(56) References Cited

U.S. PATENT DOCUMENTS

| | | | | |
|---|---|---|---|---|
| 5,715,460 | A * | 2/1998 | Acker et al. | 717/140 |
| 5,884,082 | A * | 3/1999 | Seidel et al. | 717/128 |
| 6,205,492 | B1 * | 3/2001 | Shaw et al. | 719/321 |
| 6,311,320 | B1 * | 10/2001 | Jibbe | 717/111 |
| 6,405,364 | B1 * | 6/2002 | Bowman-Amuah | 717/101 |
| 6,658,646 | B1 * | 12/2003 | Hernandez, III | 717/115 |
| 6,721,941 | B1 * | 4/2004 | Morshed et al. | 717/127 |
| 7,082,598 | B1 * | 7/2006 | Le et al. | 717/127 |
| 7,124,401 | B2 * | 10/2006 | Muller et al. | 717/124 |
| 7,152,229 | B2 * | 12/2006 | Chong et al. | 717/146 |
| 7,209,851 | B2 * | 4/2007 | Singh et al. | 702/119 |
| 7,234,144 | B2 * | 6/2007 | Wilt et al. | 718/104 |
| 7,305,659 | B2 * | 12/2007 | Muller et al. | 717/127 |
| 7,404,177 | B1 * | 7/2008 | Greenfield et al. | 717/106 |
| 7,434,205 | B1 * | 10/2008 | Steenhagen et al. | 717/124 |
| 7,512,512 | B2 * | 3/2009 | Foote et al. | 702/127 |
| 7,555,549 | B1 * | 6/2009 | Campbell et al. | 709/224 |
| 7,631,309 | B2 * | 12/2009 | Wilt et al. | 718/104 |
| 7,761,859 | B2 * | 7/2010 | Low | 717/140 |
| 7,793,279 | B1 * | 9/2010 | Le et al. | 717/168 |
| 7,958,488 | B2 * | 6/2011 | Cifra | 717/106 |

OTHER PUBLICATIONS

Coutinho et al, "Interleaving behavioral and cycle accurate descriptions for reconfigurable hardware compilation", IEEE FCCM, pp. 1-10, 2005.*
Proudfoot et al, "A real time procedural shading system for programmable graphics hardware", ACM SIGGRAPH, pp. 159-170, 2001.*
Lee et al, "Debug all your code: protable mixed environmental debugging", ACM OOPSLA, pp. 207-225, 2009.*
Unger et al, "Self", ACM pp. 1-50, 2007.*

* cited by examiner

*Primary Examiner* — Anil Khatri
(74) *Attorney, Agent, or Firm* — Zilka-Kotab, PC

(57) ABSTRACT

A system, method, and computer program product are provided for controlling a driver. In use, at least one script is received. Further, control code is generated based on the script. The control code is then executed during runtime for controlling a driver.

20 Claims, 6 Drawing Sheets

SYSTEM, METHOD, AND COMPUTER PROGRAM PRODUCT FOR CONTROLLING A DRIVER UTILIZING SCRIPTS

FIELD OF THE INVENTION

The present invention relates to drivers, and more particularly to controlling a driver.

BACKGROUND

To date, many hardware suppliers must manually customize their drivers for each customer [e.g. original equipment manufacturer (OEM), end user, etc.] who desires driver customization. To accomplish this, each customer typically selects from a plurality of predetermined fixed functions, and the hardware supplier must manually encode the desired functionality in the supporting driver (e.g. by providing registry keys for enabling the aforementioned fixed functions, etc.). Unfortunately, this process is tedious and must be repeated for each customer who desires customization.

For example, such customization often results in a configuration file or the like being generated for use by each customer in conjunction with the hardware driver. Further, intimate knowledge of the hardware and driver is typically required for mapping the desired functionality requested by each customer to the underlying capabilities of the hardware. These issues are further exacerbated in situations where a customer base and number of fixed functions grow in size.

There is thus a need for addressing these and/or other issues associated with the prior art.

SUMMARY

A system, method, and computer program product are provided for controlling a driver. In use, at least one script is received. Further, control code is generated based on the script. The control code is then executed during runtime for controlling a driver.

DETAILED DESCRIPTION

Figure 1:
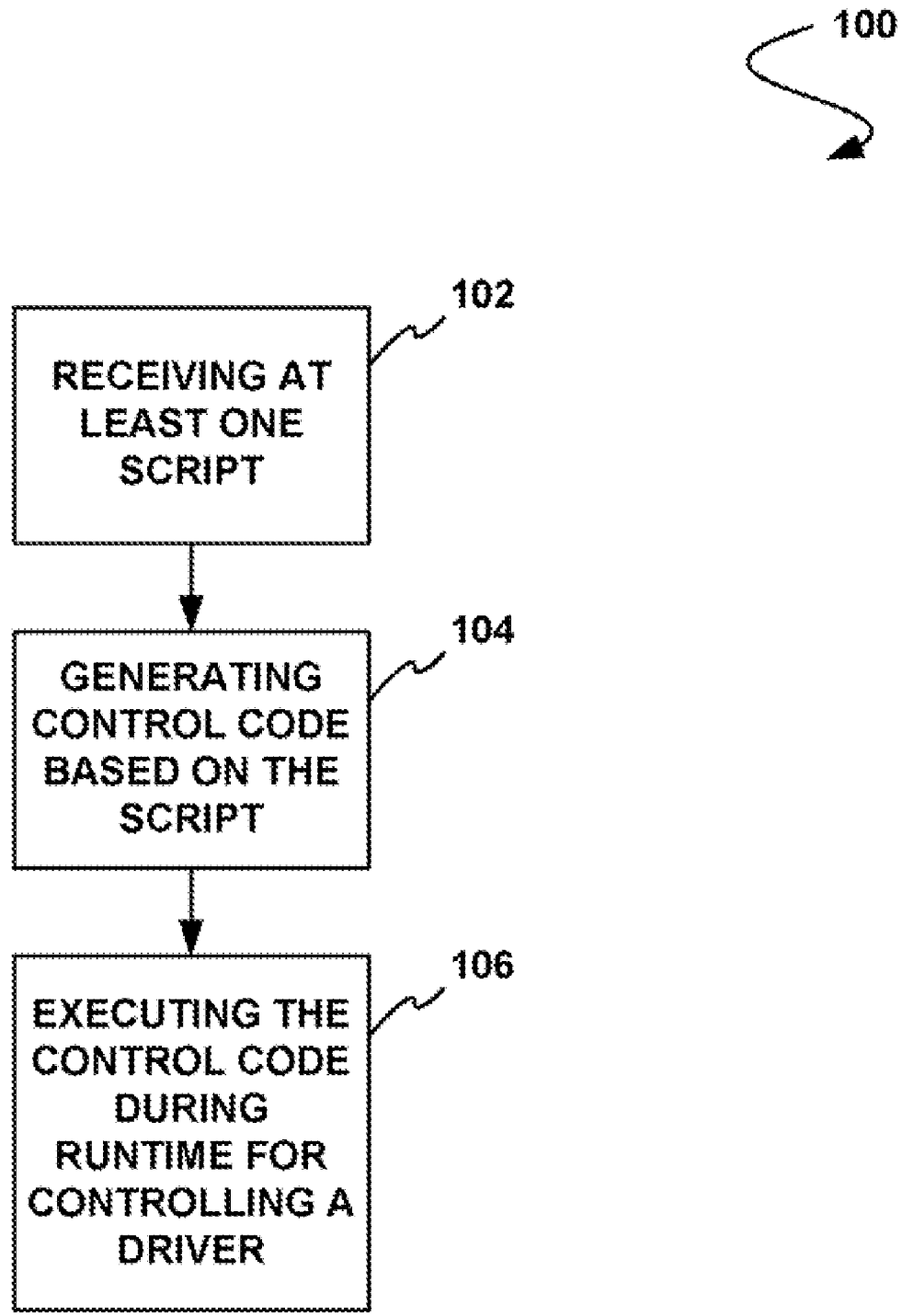
FIG. 1 shows a method for controlling a driver, in accordance with one embodiment.

FIG. 1 shows a method 100 for controlling a driver, in accordance with one embodiment. In the context of the present description, such driver may refer to any software that interfaces hardware for controlling at least one aspect thereof. Of course, such hardware may include a processor, network adapter, and/or any other integrated circuit or system including at least one integrated circuit, for that matter.

As shown, at least one script is received. Note operation 102. In the context of the present description, such script may refer to any program or sequence of instructions that is interpreted to generate other code (to be set forth hereinafter in greater detail).

Non-limiting examples of script languages that may be used to generate such script may include, but are not limited to Perl, Rexx, JavaScript, Tcl/Tk, VBScript, C++, etc. Of course, other proprietary scripts may be used as well, as will be set forth hereinafter in greater detail. In one optional embodiment, the script may include a language that is easier for a human to program with, but requires conversion to other code that, in turn, is ultimately executed.

As will be elaborated upon during the description of later embodiments, the script may be received in any desired manner. For example, in one embodiment, the script may be received from a customer [e.g. an original equipment manufacturer (OEM), etc.] of the aforementioned hardware. In another embodiment, the script may be received from an end user of the hardware. Of course, the script may be received in any desired manner from any desired source (e.g. even the hardware supplier, in one embodiment).

Next, in operation 104, control code is generated based on the script. In the context of the present description, such control code may include any code that takes on a different format than the script received in operation 102. Just as one possible example, the control code may take the form of byte code. In one embodiment, the control code may be generated by compiling the script.

The control code is then executed during runtime for controlling a driver. See operation 106. Such runtime may refer to any time during which the driver is running. Further, the control code may be executed for controlling any aspect of the driver which may, in turn, control the aforementioned hardware. It should be noted that such control may be administered utilizing any desired mechanism (e.g. virtual machine, a plug-in, control module, etc.).

By this design, the foregoing features may, in one embodiment, allow customers, end users, etc. to define desired functionality utilizing the script. Such script may then be compiled to generate control code (e.g. byte code, etc.). During runtime, this control code may be executed in conjunction with the driver for customizing driver functionality to perform the customer/user-specific functionality, under the direction of the control code. In one embodiment, such feature may allow a hardware supplier to, at least in part, avoid having to perform such customization on a manual basis.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
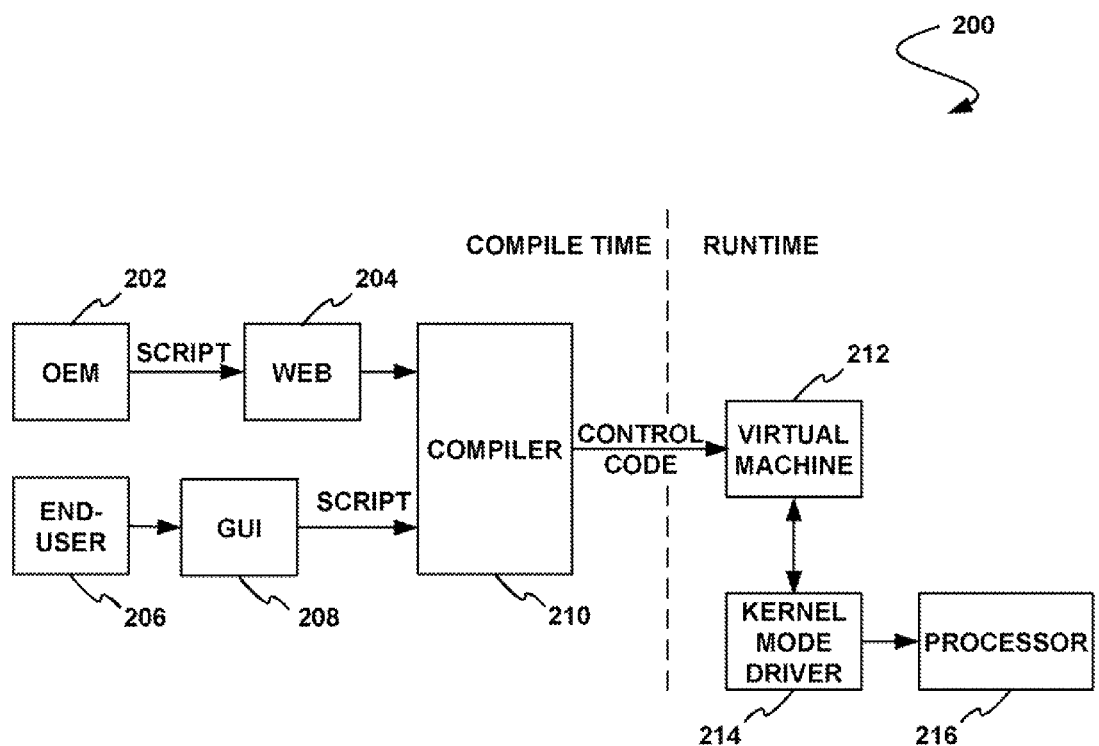
FIG. 2 shows a system for controlling a driver, in accordance with one embodiment.

FIG. 2 shows a system 200 for controlling a driver, in accordance with one embodiment. As an option, the present system 200 may be implemented to can out the method 100 of FIG. 1. Of course, however, the system 200 may be implemented in any desired environment. It should also be noted that the aforementioned definitions may apply during the present description.

As shown, at least one script may be generated in one of two ways. For example, an OEM 202 may simply use a script language to generate at least one script. Such script may then be delivered in any desired manner. For example, such script may be communicated over a network such as the World Wide Web 204. Of course, other modes of delivery (e.g. using a disc, jump drive, print out, etc.) are also contemplated. In one embodiment, the OEM 202 may be provided with a graphical user interface for facilitating the generation of the script, as will be set forth below in greater detail.

Still yet, an end user 206 may have access to a graphical user interface 208 with which the user may enter the script. As an option, the graphical user interface 208 may be accessible over a network (e.g. be web-based, etc.). Such graphical user interface 208 may, in one embodiment, simply serve as an interface for allowing entry of the script, and/or include enhanced features such as a tutorial, library of scripts, and/or any other mechanism for facilitating entry of the necessary input to generate the script.

In any case, the script is delivered to a compiler 210, which serves to compile the received script to generate control code (e.g. byte code, etc.), during compile time as shown. In one embodiment, the control code may be stored in a file. Such control code may, in turn, be incorporated and/or interfaced with a driver 214 (e.g. kernel mode driver, etc.) that, in turn, controls a processor 216. As an option, the control code may be fed to a virtual machine 212 that exists in conjunction with the driver 214, for the specific purpose of being executed by the virtual machine 212 for controlling the driver 214.

In the context of the present description, the virtual machine 212 may include any program that provides an operating environment that works in conjunction with, yet independent of the driver 214. Non-exhaustive examples of the virtual machine 212 include an HTML virtual machine, a JAVA™ virtual machine, etc. More information regarding one way the virtual machine 212 may be used to control the driver 214 will be set forth in greater detail during the description of FIG. 3.

While the compiler 210 is shown to be separate from the virtual machine 212 and the driver 214 in FIG. 2, it should be noted that such components may or may not be integrated, as desired. To this end, embodiments are completed where the script is compiled using the virtual machine 212 and/or the driver 214, etc.

Figure 3:
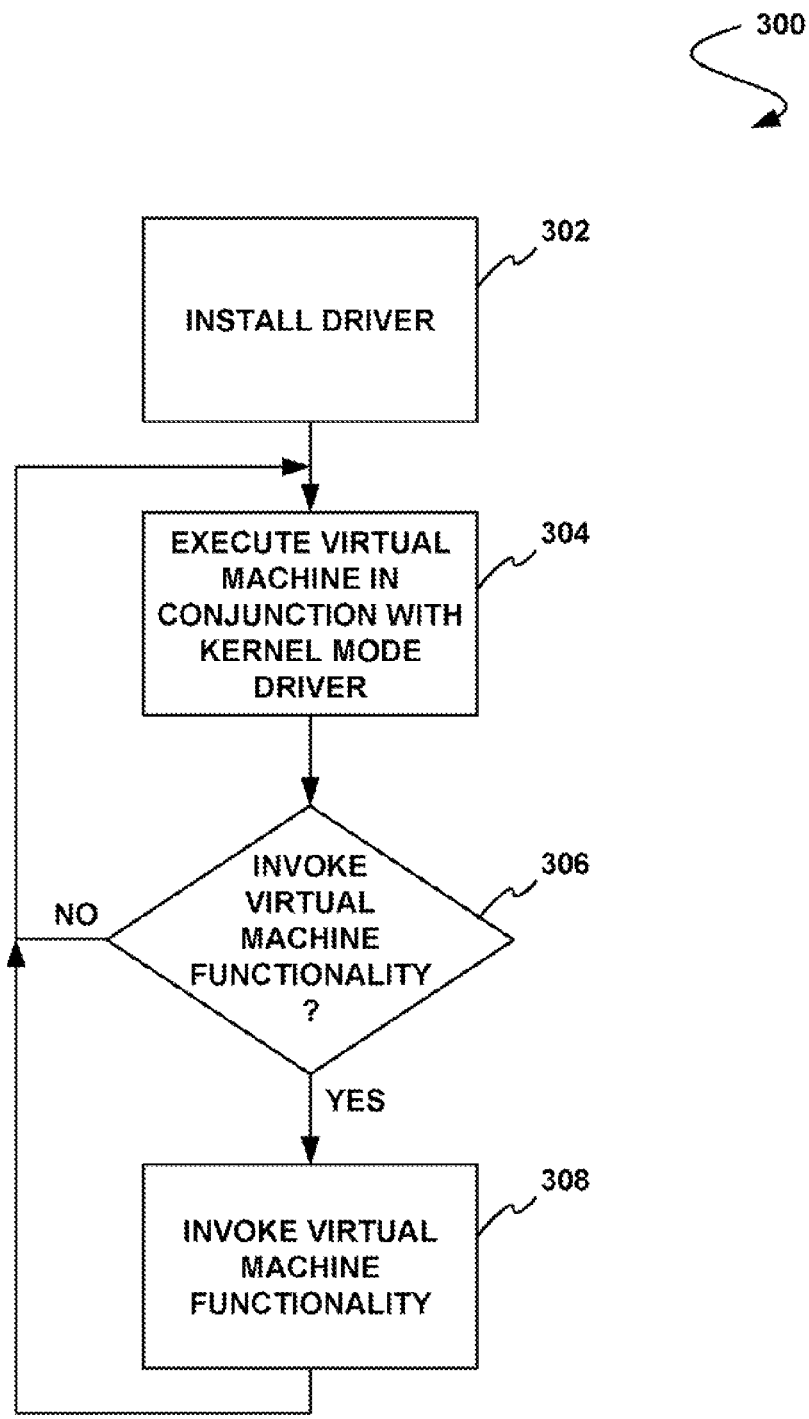
FIG. 3 shows a method for controlling a driver using control code executed utilizing a virtual, machine, in accordance with another embodiment.

FIG. 3 shows a method 300 for performing controlling a driver using control. Code executed utilizing a virtual machine, in accordance with another embodiment. As an option, the present method 300 may be implemented in the context of the functionality and architecture of FIGS. 1-2. For example, the method 300 may represent the functionality of the virtual machine 212 and/or the driver 214 of FIG. 2. Of course, however, the method 300 may be carried out in any desired environment. It should also be noted that the aforementioned definitions may apply during the present description.

As shown in FIG. 3, a driver (e.g. the driver 214 of FIG. 2) may be installed. Note operation 302. Such installation may be performed by an OEM, end user, and/or any other entity for the purpose of interfacing any desired hardware. In one embodiment, the driver may have installed therewith a virtual machine (e.g. the virtual machine 212 of FIG. 2). Before or after such installation of operation 302, the virtual machine may be equipped with control code adapted to control the virtual machine to, in turn, control the driver for providing additional (e.g. customized) functionality.

After installation, the virtual machine may be executed during runtime. See operation 304. In one embodiment, this may involve execution of the virtual machine in conjunction with the driver. For example, in one embodiment, the virtual machine may be a plug-in installed in conjunction with the driver such that, upon execution of the driver, the virtual machine is also executed. In another embodiment, the virtual machine may be a separate module that executes in response to operation of the driver or visa-versa, etc.

During use, it is determined when any functionality provided by the virtual machine is invoked. See decision 306. In one embodiment, such functionality may be trigged by input, actions taken by, output of the driver for any other application program/hardware) or any other triggering event, for that matter. Based on the trigger and any particular parameters, the virtual machine may provide any desired specific resultant functionality that would not otherwise be performed by the driver, etc. See operation 308. It should be noted that such functionality may modify any already-existing functionality and/or simply supplement already-existing functionality with new functionality.

In one embodiment, the virtual machine may trigger any desired predetermined fix functions that are within the capabilities of the hardware and/or impact any desired flow control, etc. Just as one possible example, the virtual machine may monitor for a situation where a particular hot key is pressed by the user, a specific state (e.g. standby, performance mode, boot-up sequence, etc.) is invoked, etc., so that a corresponding reaction may be carried out. For example, based on any of the foregoing triggers (or any other), the hardware (under the control of the driver) may be controlled to perform a power savings operation, performance-enhancing task, feature-enabling action, a specific flow, etc.

Strictly as an option, additional functionality may be added at a time after the installation of the driver. For instance, such additional functions may be updated utilizing additional scripts. Such scripts may be received in any desired manner. For example, an existing script may be modified, a supplement script may be received, etc. To this end, the modified or supplemental script may be compiled and added to or used to replace the control code that serves to manage the virtual machine/driver.

Figure 4:
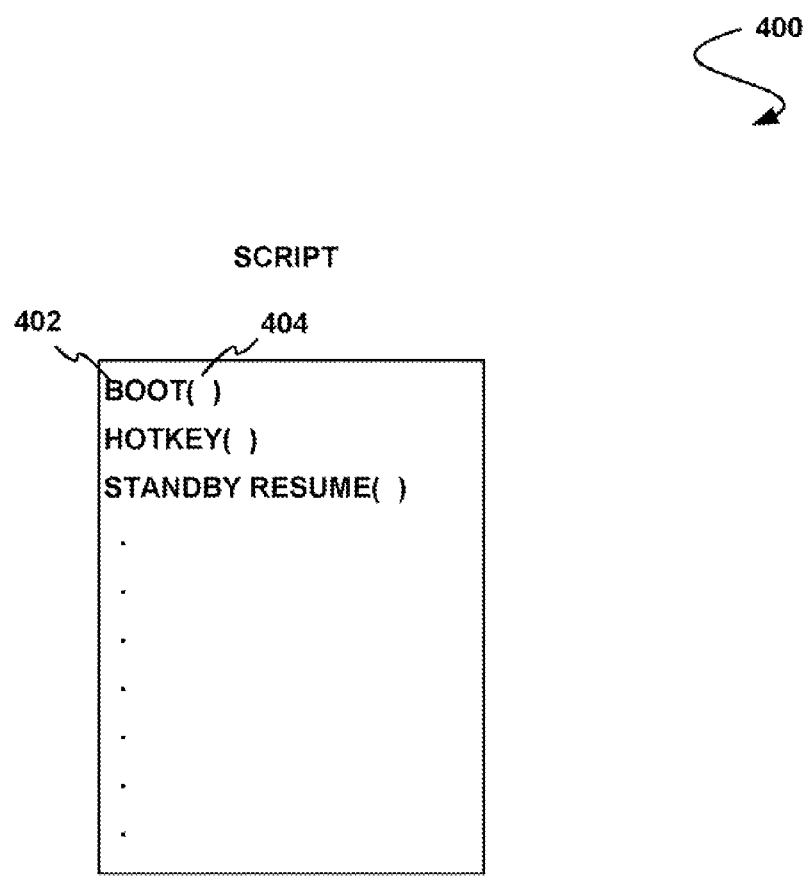
FIG. 4 shows a script for indicating functionality to be implemented in conjunction with a driver, in accordance with another embodiment.

FIG. 4 shows a script 400 for indicating functionality to be implemented in conjunction with a driver, in accordance with another embodiment. As an option, the present script 400 may be used in the context of the functionality and architecture of FIGS. 1-3. For example, the script 400 may be input to the compiler 210 of FIG. 2 for generating control code, etc. Of course, however, the script 400 may be used in any desired environment. Again, the aforementioned definitions may apply during the present description.

As shown, the script 400 may include a plurality of commands 4.02, parameters 404, etc. In use, such commands 402 and parameters 404 may be selected and used to define various desired functionality to be provided in association with driver execution. As shown, the script 400 may include commands 402 that identify a particular hot key, a specific state (e.g. standby, performance mode, boot-up sequence, etc.), etc. Still yet, the parameters 404 may include various actions, for example, to be taken in association with the aspects associated with the commands 402. Of course, the forgoing exemplary commands 402 and parameters 404 of FIG. 4 are set forth for illustrative purposes only and should not be construed as limiting in any manner whatsoever.

Figure 5:
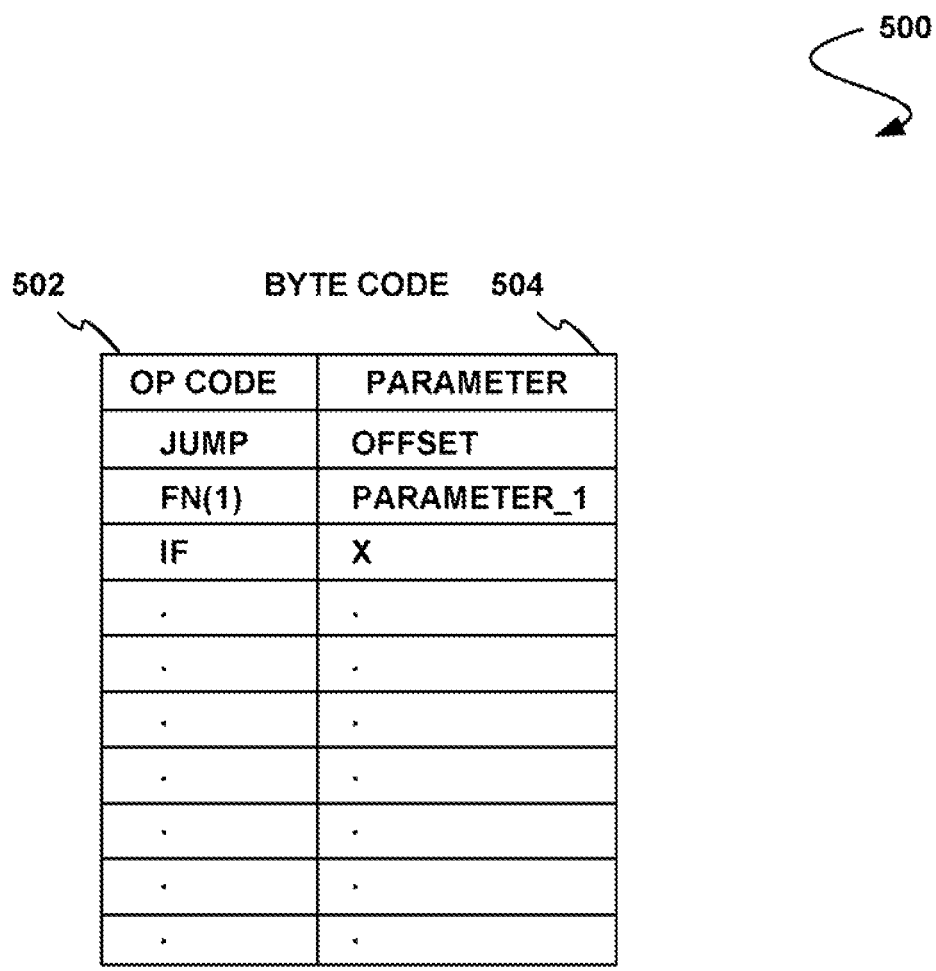
FIG. 5 shows control code for controlling a driver to perform desired functions, in accordance with another embodiment.

FIG. 5 shows control code 500 for controlling a driver to perform desired functions, in accordance with another embodiment. As an option, the present control code 500 may be used in the context of the functionality and architecture of FIGS. 1-3. For example, the control code 500 may be output from the compiler 210 of FIG. 2 for use in association with the virtual machine 212 to control the driver 214, etc. Of course, however, the control code 500 may used in any desired environment. Again, the aforementioned definitions may apply during the present description.

As shown, the control code 500 may include a plurality of op code commands 502, parameters 504, etc. Unlike the commands 402, parameters 404, etc. of the script 400 of FIG. 4, however, such op code commands 502 and parameters 504 are compiled in a form that may be executed in association with a virtual machine and driver, for controlling the driver. As shown, the commands 502 and parameters 504 may include a jump and other instructions, as well as specific functions and various logical operations (e.g. Boolean, if-then, etc.).

Again, the forgoing exemplary commands 502, parameters 504, etc. of FIG. 5 are set forth for illustrative purposes only and should not be construed as limiting in any manner whatsoever. For example, in some embodiments, the specific commands 502 and parameters 504 may vary as a function of what hardware is being interfaced by the driver. In one embodiment, for instance, the available commands 502 and parameters 504 may reflect all of the capabilities of the particular hardware.

Figure 6:
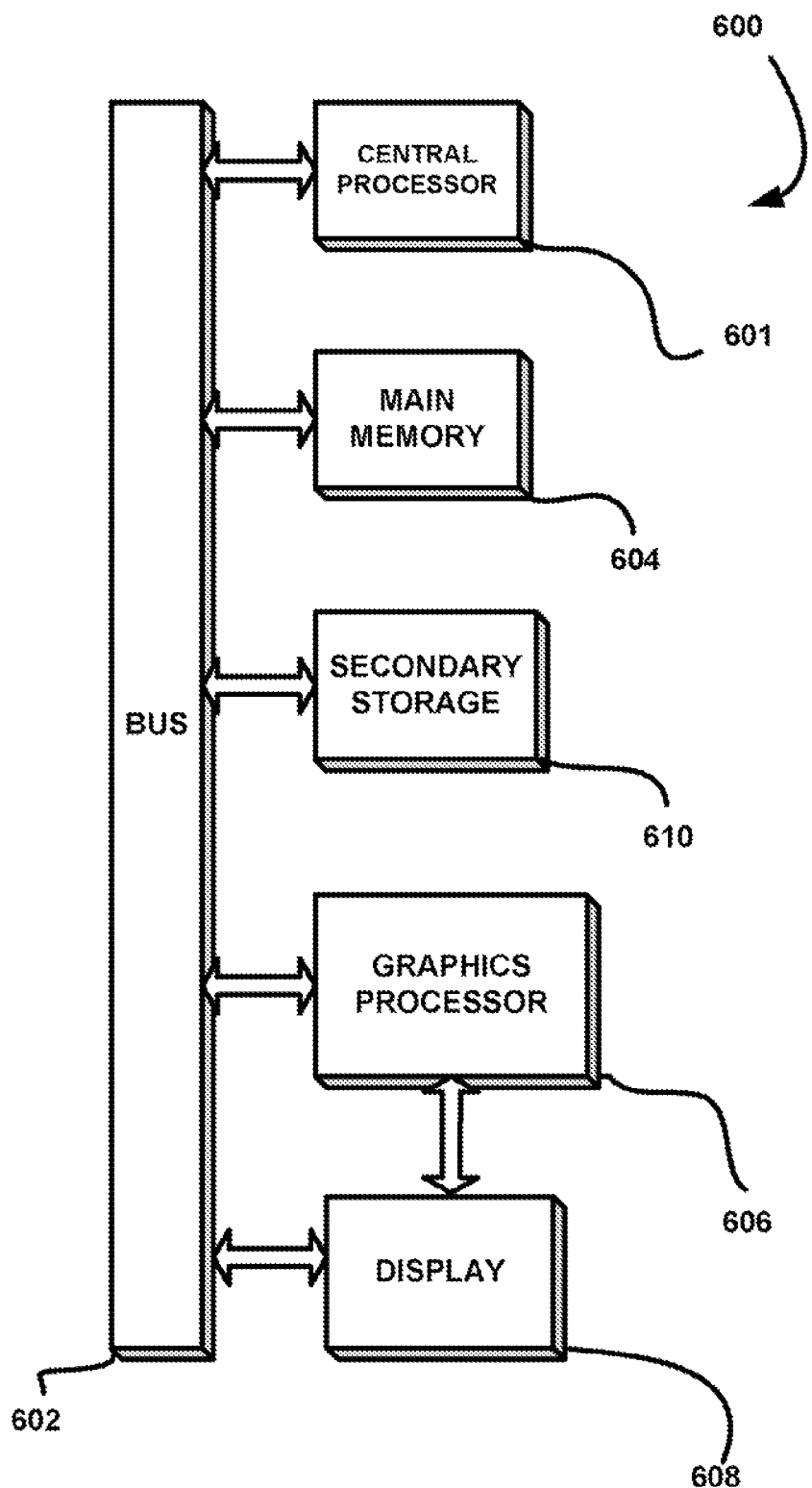
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. For example, the driver 214 and virtual machine 212 of FIG. 2 may be used to interface and control any of the hardware of the system 600 of FIG. 6. Of course, the system 600 should not be construed as limiting in any manner whatsoever in this regard.

As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media. Stored on any of the aforementioned computer-readable media may be a driver/virtual machine for interfacing arty of the hardware disclosed herein.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices m including, but not limited to a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method, comprising:
receiving at least one script;
generating control code based on the at least one script, utilizing a processor; and
executing the control code during runtime for controlling a driver;
wherein the at least one script is received utilizing a graphical user interface;
wherein desired functionality of the driver is defined utilizing the at least one script.
2. The method of claim 1, wherein the at least one script is received from a customer.
3. The method of claim 2, wherein the customer includes an original equipment manufacturer.
4. The method of claim 1, wherein the graphical user interface is accessible over a network.
5. The method of claim 1, wherein the control code includes byte code.
6. The method of claim 1, wherein the control code is executed utilizing the virtual machine.
7. The method of claim 1, wherein the driver includes a kernel mode driver.
8. The method of claim 1, wherein the execution of the control code results in the driver performing additional functions.
9. The method of claim 8, wherein the additional functions are performed in response to triggering events.
10. The method of claim 8, wherein the additional functions are updated.
11. The method of claim 10, wherein the additional functions are updated utilizing additional scripts.
12. The method of claim 1, wherein the driver controls a processor.
13. The method of claim 12, wherein the processor includes a graphics processor.

14. The method of claim 1, wherein the at least one script adds additional functionality at a time after an installation of the driver.

15. The method of claim 1, wherein the at least one script includes a modification of an existing script.

16. The method of claim 1, wherein the at least one script is received from a hardware supplier or an end user of hardware.

17. The method of claim 1, wherein the control code includes a plurality of op code commands and parameters which vary as a function of what hardware is being interfaced by the driver.

18. A computer program product embodied on a computer readable medium, comprising:
   computer code for receiving at least one script;
   computer code for generating control code based on the at least one script; and
   computer code for executing the control code during runtime for controlling a driver;
   wherein the at least one script is received utilizing a graphical user interface;
   wherein desired functionality of the driver is defined utilizing the at least one script.

19. An apparatus, comprising:
   a processor;
   a compiler for generating control code based on at least one script; and
   a virtual machine in communication with the compiler, the virtual machine for executing the control code during runtime for controlling a driver;
   wherein the at least one script is received utilizing a graphical user interface;
   wherein desired functionality of the driver is defined utilizing the at least one script.

20. The apparatus of claim 19, wherein the driver interfaces a processor in communication with memory and a display via a bus.

* * * * *

UNITED STATES PATENT AND TRADEMARK OFFICE
CERTIFICATE OF CORRECTION

| | | |
|---|---|---|
| PATENT NO. | : 8,020,150 B1 | Page 1 of 1 |
| APPLICATION NO. | : 11/747328 | |
| DATED | : September 13, 2011 | |
| INVENTOR(S) | : Han et al. | |

It is certified that error appears in the above-identified patent and that said Letters Patent is hereby corrected as shown below:

In the claims:
    Claim 1, col. 6, line 42; please replace "script." with --script;-- and insert the following on a new line after line 42:
    --wherein the at least one script is compiled utilizing the driver and a virtual machine.--;
    Claim 18, col. 8, line 2; please replace "script." with --script;-- and insert the following on a new line after line 2:
    --wherein the at least one script is compiled utilizing the driver and a virtual machine.--;
    Claim 19, col. 8, line 13; please replace "script." with --script;-- and insert the following on a new line after line 13:
    --wherein the at least one script is compiled utilizing the driver and the virtual machine.--.

Signed and Sealed this
Third Day of January, 2012

David J. Kappos
*Director of the United States Patent and Trademark Office*